(12) United States Patent
Itakura et al.

(10) Patent No.: US 6,493,832 B1
(45) Date of Patent: Dec. 10, 2002

(54) COMMUNICATION APPARATUS WHICH HANDLES A TIME STAMP

(75) Inventors: Eisaburo Itakura, Kanagawa (JP);
Yoichi Matsumura, Kanagawa (JP);
Katsumi Tahara, Kanagawa (JP);
Hiroaki Seto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/280,430

(22) Filed: Mar. 29, 1999

(30) Foreign Application Priority Data

Mar. 17, 1999 (JP) .......................... 11-072303

(51) Int. Cl.[7] .................................. G06F 1/04
(52) U.S. Cl. ................ 713/600; 713/400; 713/503
(58) Field of Search ........................ 713/400, 401, 713/500, 501, 503, 600

(56) References Cited

U.S. PATENT DOCUMENTS

| | | | |
|---|---|---|---|
| 4,961,188 A | | 10/1990 | Lau |
| 5,260,978 A | | 11/1993 | Fleischer et al. |
| 5,467,342 A | * | 11/1995 | Logston et al. ............ 370/253 |
| 5,781,599 A | | 7/1998 | Shiga |
| 5,790,543 A | * | 8/1998 | Cloutier ...................... 370/395 |
| 5,805,602 A | * | 9/1998 | Cloutier et al. ............. 370/516 |
| 5,966,387 A | * | 10/1999 | Cloutier ...................... 370/516 |
| 6,111,896 A | * | 8/2000 | Slattery et al. ............. 370/535 |

FOREIGN PATENT DOCUMENTS

| | | |
|---|---|---|
| JP | 8-149428 | 6/1996 |
| JP | 8-340350 | 12/1996 |
| JP | 8-340514 | 12/1996 |
| JP | 9-36867 | 2/1997 |
| JP | 10-51769 | 2/1998 |
| JP | 10-126371 | 5/1998 |

* cited by examiner

*Primary Examiner*—Dennis M. Butler
(74) *Attorney, Agent, or Firm*—Frommer Lawrence & Haug LLP; William S. Frommer

(57) ABSTRACT

A transmission side of a communication apparatus of the present invention makes use of a clock signal synchronized with a network to transmit an arrival interval of a PCR packet in which a PCR value is included and a synchronization residual. A reception side of the communication apparatus of the present invention calculates delay fluctuations caused by the network from the arrival interval and the synchronization residual included in the received PCR packet and modifies the PCR value based on the delay fluctuations.

2 Claims, 6 Drawing Sheets

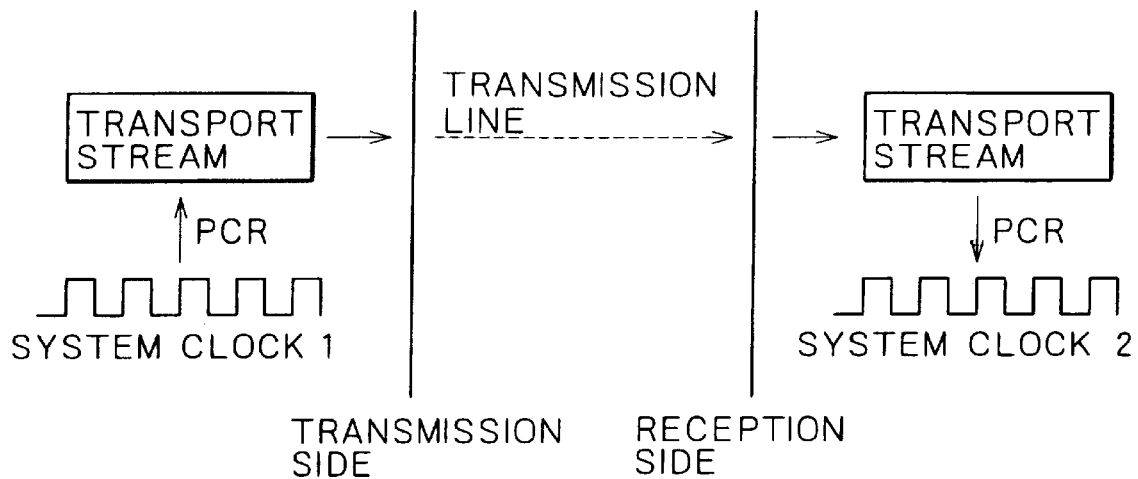
FIG. I
PRIOR ART
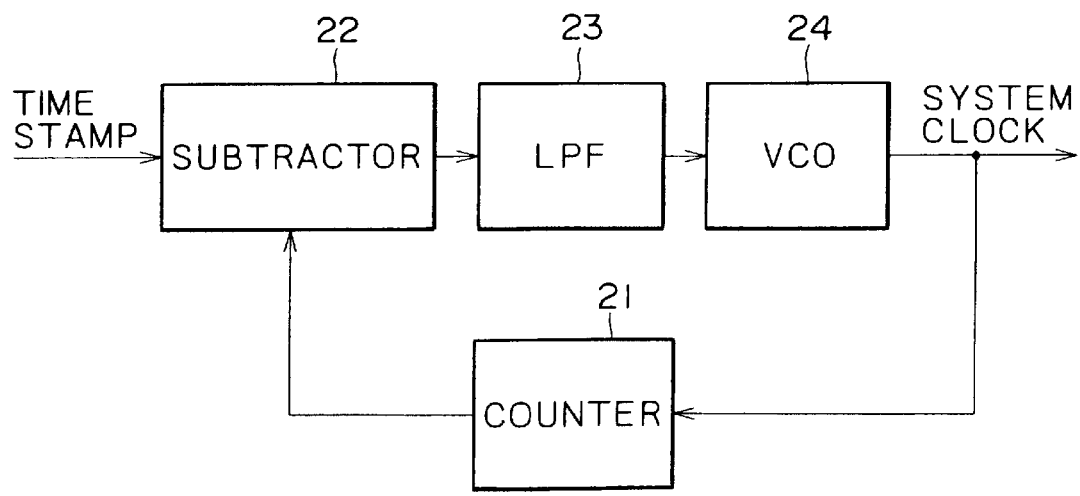
FIG. 2
PRIOR ART

COMMUNICATION APPARATUS WHICH HANDLES A TIME STAMP

BACKGROUND OF THE INVENTION

This invention relates to a communication apparatus suitable for use in a system which digitizes audio data and/or video data using an ATM communication technology or the like, encodes the digitized data in accordance with, for example, the MPEG system, converts the encoded data into packets of a transport stream of the MPEG system and transmits the packets through a predetermined network, requiring clock synchronization with the transmission side upon decoding in reception of the data packets.

In an application which uses digital sound and/or an image, a decoder must perform decoding in synchronism with an information generation source such as, for example, output data of an encoder or stored or recorded data in encoded form. If the decoder can control the information generation source, then it is possible to adjust the rate of data to be transmitted. In this instance, the decoder should rely only upon the timing of received data to decode the data and perform display of an image or reproduction of sound.

However, where the decoder does not have a controlling function for the information generation source, for example, when data are transmitted to the decoder through a network, since the information generation source and the decoder operate with system clock signals independent of each other, coding/transmission and reception/decoding/display and so forth are performed with the system clock signals of the information generation source and the decoder, respectively. If the system clock signals do not have a common clock signal to which they can refer to each other, then the system clock signals of the information generation source and the decoder exhibit a displacement in frequency. If the two clock signals are not in synchronism with each other, the information rates of data transmitted from the information generation source and data decoded by the decoder become different from each other, and as a result, a reception buffer of the decoder overflows or underflows. Consequently, data are lost, and therefore, for example, in regard to an image, it becomes necessary to re-display a frame.

One of methods for synchronizing the system clock signal of an information generation source and the system clock signal of a decoder with each other employs information representative of a time, that is, a time stamp.

In an MPEG transport stream, a PCR (Program Clock Reference) is used as a time stamp to establish synchronism. A concept of synchronization is illustrated in FIG. 1.

A source clock of the information generation source has a counter which has a certain cycle, and a system clock signal operates the counter. The value of the counter is latched after each certain interval of time, although such interval need not be a fixed interval, and the latched value is transmitted to the decoder. This value is so-called time stamp, and the decoder uses this value to synchronize the system clock signal of its own with the system clock signal of the information generation source. Particularly, the count value held by the decoder and the received time stamp are compared with each other, and then the reception side system clock signal is controlled to increase or decrease in rate to synchronize the decoder with the information generation source based on a result of the comparison.

A construction of a phase comparison circuit provided for such synchronization on the reception side is shown in FIG. 2. Referring to FIG. 2, the phase comparison circuit is generally denoted at 20, and a time stamp received is inputted to the phase comparison circuit 20, in which it is subtracted from a value of a counter 21 by a subtractor 22 in order to compare it with the value of the counter 21. A difference obtained by the subtraction is inputted to a low-pass filter (LPF) 23, and an output of the low-pass filter 23 is converted from a digital signal into an analog signal by a digital-to-analog converter not shown and used to control a voltage controlled oscillator (VCO) 24.

An output of the VCO 24 is used as a system clock signal of the decoder, and the counter 21 is operated with the system clock signal, thereby forming a feedback loop.

Such a synchronization method as described above is employed by the MPEG-2 system layer (ISO/IEC 13818-1) and the ITU-T recommendations. In the MPEG-2, a system clock of 27 MHz is used for an encoder and a decoder. A system construction of a network which transmits data formed in accordance with the MPEG-2 is shown in FIG. 3. Referring to FIG. 3, the information generation source is a coding apparatus such as an encoder 31. However, the information generation source may alternatively be a storage apparatus which has stored encoded data in advance and can output the stored data.

Information generated by the encoder 31 is inputted to a system encoder 32. The system encoder 32 performs addition of a time stamp to the information generated by the encoder 31, conversion of the resulting information into packets and multiplexing of them to generate transport stream packets.

An MPEG-to-ATM conversion section 33 converts the transport stream into ATM cells and transmits the ATM cells to the reception side through a network 34. Upon the transmission to the reception side, the ATM cells are influenced by various delay fluctuations in the network. Production of such delay fluctuations is hereinafter described in connection with ATM cells.

A time stamp which contains such delay fluctuations is first converted into a system packet by an ATM-to-MPEG conversion section 35 and then processed by a system decoder 36 so that a system clock signal of the decoder is reproduced from the time stamp. In the case of the MPEG, a system clock signal of 27 MHz is reproduced and inputted to the decoder. The data processed by the system decoder 36 are decoded by a decoder 37.

The MPEG-2 system layer involves two streams, called as program stream and transport stream. The program stream is expected to be used in a system which is free from an error, such as a storage medium while the transport stream is expected to be used with a system which involves some error such as communication. In the program stream, a time stamp is called as an SCR (system clock reference) and is transmitted after an interval of at least 0.7 seconds or less. The SCR time stamp is included in a header of a program stream packet and is present only in packets which are used to transmit the SCR.

In a transport stream packet, a time stamp is called as a PCR (program clock reference) and is transmitted after an interval of at least 0.1 second or less. The PCR time stamp is included in a header of a transport stream packet and is present only in packets which are used to transmit the PCR.

Particularly, the PCR comprises 42 bits in total and includes two parts, of a program clock reference extension and of a program clock reference base. The former has 9 bits while the latter has 33 bits. The former counts from 0 to 299, and the latter is incremented by one with a carrier from the former. Where the system clock signal of 27 MHz in the MPEG-2 is used, a time for 24 hours can be counted in units of a 27 MHz clock by using the 42-bit counter. In other words, the PCR is considered to be a value (PCR value) of a PCR counter which is counted with a system clock signal.

As reference documents relating to the present invention, the following three documents are listed:

[1] M. Perkins and P. Skelly, "A Hardware MPEG Clock Recovery Experiment in the Presence of ATM Jitter", ATM Forum contribution to the SAA sub-working group, 94-0434, May 1994;

[2] G. Franceschini, "Extension of the Adaptive Clock Method to Variable Bit Rate Streams", ATM Forum contribution to the SAA sub-working group, 94-0321, May 1994; and

[3] ISO/IEC13818-1 (MPEG-2 Systems), "GENERIC CODING OF MOVING PICTURES AND ASSOCIATED AUDIO", Recommendation H.222.0, ISO/IEC JTC/SC29/WG11 NO721rev, June, 1994.

The document [1] discloses trial production of hardware for synchronization with a system clock signal of an information generation source based on data obtained by simulation of jitters generated on an ATM. The document is good to be referred to learn how synchronism is established.

The document [2] describes how to establish synchronism regarding a variable bit rate, but does not mention a delay fluctuation reduction circuit of the present invention.

The document [3] is a draft complying to international standards regarding the MPEG-2 system.

By the way, if time stamps added and transmitted by an information generation source such as an encoder side arrive at the decoder side with accurately equal intervals, then it is easy for the decoder side to establish synchronism with the system clock signal of the encoder by using the synchronization method described above. However, this method assumes at all that the delay of the transmission line is fixed. Actually, the document [3] describes that a transmission line has a fixed delay. Accordingly, if a random delay, that is, delay fluctuations, are added to a time stamp by the network and so forth, but the value of the time stamp is not changed to a suitable value taking such delay fluctuations into consideration, this gives rise to the following problems.

In particular, the value of a time stamp inputted to a PLL of the decoder side becomes a sum of a difference in clock frequency between the information generation source and the decoder and delay fluctuations. It is difficult to construct a low-pass filter of the PLL, so that it may flatten delay fluctuations because the delay fluctuations are very great. In order to reduce delay fluctuations, a considerably long time is required for the PLL to establish synchronism or the circuit is complicated in construction.

Accordingly, a countermeasure which does not employ a PLL on the decoder side to absorb delay fluctuations is required. An example of this problem is provided by a case wherein a transport stream of the MPEG-2 is used on an ATM (Asynchronous Transfer Mode) network. Due to delay fluctuations which are caused when statistical multiplexing which is a characteristic of the ATM is performed, or when a cell queues up in a buffer when transmission in a same direction from a plurality of nodes occurs on an ATM switch, an ATM cell suffers from random delay fluctuations. The ATM network performs switching based only on a header ignoring contents of a payload, so it does not rewrite a time stamp either. Accordingly, there is a problem that, even if an ATM cell is composed into an MPEG-2 system layer packet, delay fluctuations are still transmitted. In order to solve this problem, the VOD standards 1.1 of the ATM Forum recommend a method wherein a buffer is provided on the reception side so that a clock is reproduced by a PLL of a decoder while jitters are absorbed to some degree by the buffer. This method is called adaptive clock method. In a system of this type shown in FIG. 4, some amount of data is stored into a FIFO 42 on the reception side, and the output data rate from the FIFO 42 is controlled so that the data occupancy in the FIFO 42 may be fixed. The output data rate is controlled by feeding back the data occupancy in the FIFO 42 to a variation of the data occupancy through a low-pass filter 43. Jitters (hereinafter referred to as PCR jitters) generated on a PCR by the network 41 can be absorbed to some degree by the low-pass filter 43. However, although this system is simple without involving control of synchronous data and so forth, it cannot remove jitters of the network completely. If it is intended to decode an MPEG stream including PCR jitters, the response of the PLL should be retarded. However, this merely shapes jitter components in an analog fashion, and jitter components still remain as they are over a long period of time. Actually, jitters of 1 ms to 2 ms can be reduced only to approximately 3 $\mu$s. Accordingly, when an MPEG stream including PCR jitters is decoded and recorded in a VTR, or an image is observed on a monitor, the system does not make a significant problem since the response of the PLL is retarded. However, if it is intended to re-distribute, in regional distribution or the like, a stream transmitted by an ATM network as it is as MPEG, then the PCR jitter value cannot satisfy the MPEG standards, and jitters on the network make a significant trouble.

In other words, the system described above cannot satisfy the quality of the studio standard level, that is, ±500 ns which is a jitter value permitted to the PCR value.

Further, a related art system presumes transmission of one program. In particular, since data to be transmitted are data encoded on the same time base, only one clock is required to establish synchronism. However, for a stream of multi-programs in which data encoded with different time bases are multiplexed, a number of PLLs and clocks for synchronization equal to the number of programs are required. Thus, the related art system has a problem that the structure of the circuit is complicated.

SUMMARY OF THE INVENTION

It is thus an object of the present invention to provide a communication apparatus which allows synchronization of multimedia information in such an environment that a network generates delay fluctuations.

In order to attain the object described above, according to the present invention, on the transmission side, when an MPEG transport stream including a PCR is inputted, a difference between a count value of a network clock signal indicating a time from a preceding PCR and a PCR value in the stream counted with the network clock signal is calculated, and the count value and the resulting difference are transmitted as a PCR arrival time interval and a synchronization residual time stamp (hereinafter referred to as synchronization data), respectively. On the other hand, on the reception side, after a difference from the network clock signal is referred to based on the PCR arrival time interval and the synchronization data, calculation is performed to correct the PCR value to remove PCR jitters therefrom.

More particularly, according to an aspect of the present invention, there is provided a communication apparatus, comprising a detection for detecting a packet which includes a time stamp, a counting means for producing a clock signal synchronized with a clock signal common with that of the reception side and counting the number of clocks of the clock signal, an extraction means for extracting the count value of the counting means when a packet in which a time stamp is included arrives, a calculation means for determining an arrival interval between packets in which a time stamp is included and a synchronization residual making use of the count value extracted by the extraction means and the time stamp, and a transmission means for transmitting the packet arrival interval and the synchronization residual.

According to another aspect of the present invention, there is provided a communication apparatus, comprising a reception means for receiving a packet, a time stamp means for detecting a packet which detects, from among packets received by the reception means, those packets which include a time stamp in which information regarding a packet arrival interval and a synchronization residual is included, a detection means for detecting the packet arrival interval and the synchronization residual from the time stamp, a modification value calculation means for calculating a modification value for the time stamp from the packet arrival interval and synchronization residual and a count value obtained by counting clocks of a clock signal synchronized with a clock signal common to that of the transmission side, and a modification means for modifying the time stamp included in the received packets based on the modification value.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a diagrammatic view illustrating a concept of a related art synchronous transmission method in which a PCR is used;

FIG. 2 is a block diagram of a related art phase comparison circuit;

DESCRIPTION OF THE PREFERRED EMBODIMENT

Figure 3:
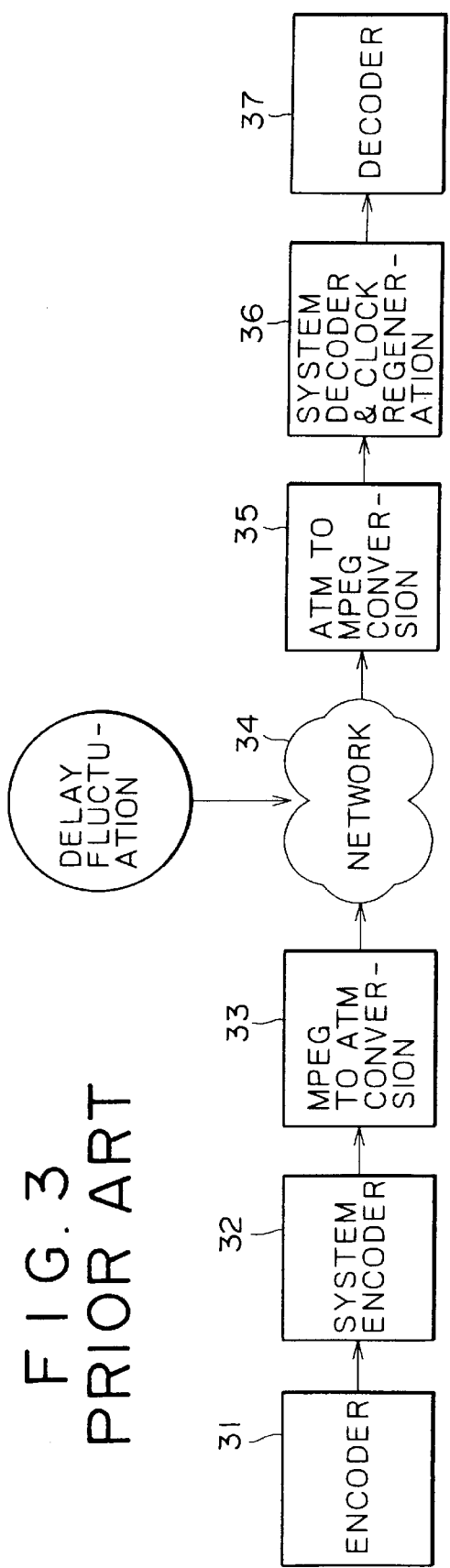
FIG. 3 is a block diagram showing a system construction a related art network.
Figure 4:
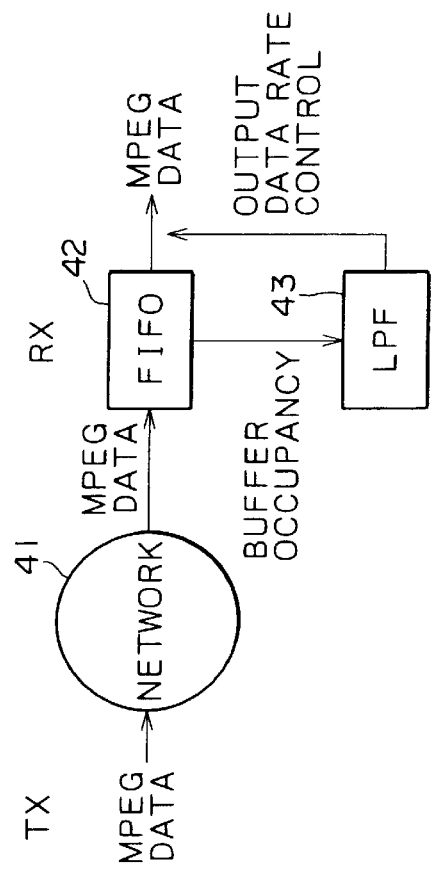
FIG. 4 is a diagrammatic view illustrating a principle of a related art adaptive clock method.
Figure 5:
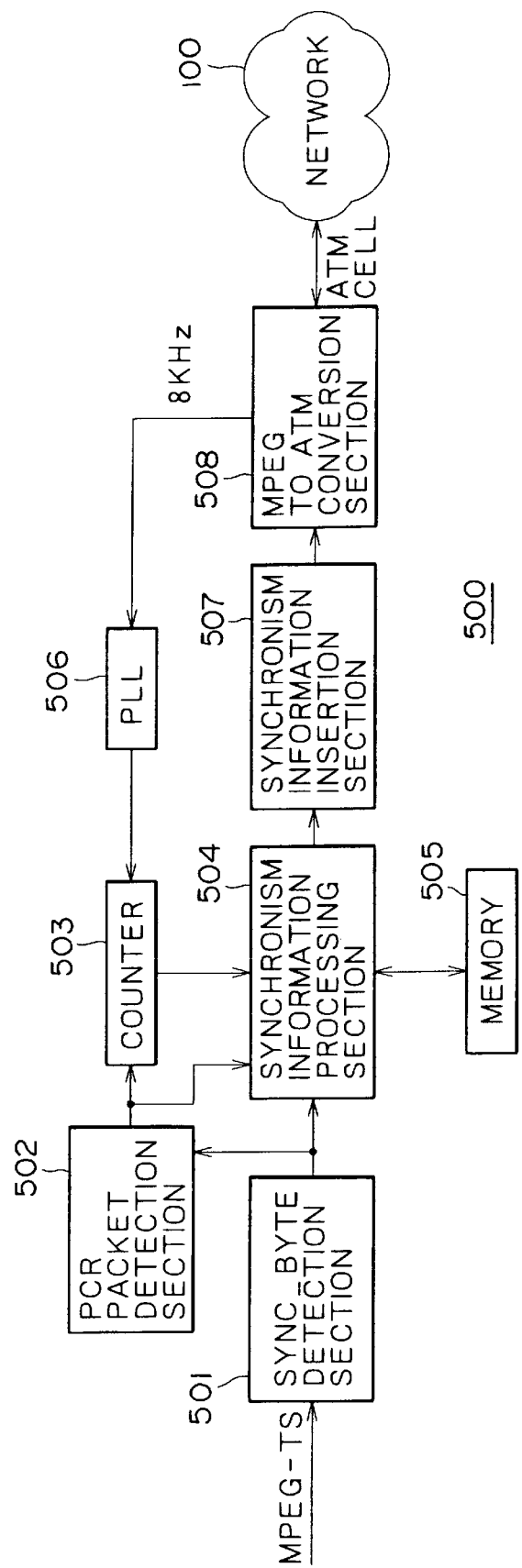
FIG. 5 is a block diagram showing a communication apparatus of the transmission side to which the present invention is applied.

Referring to FIG. 5, there is shown a communication apparatus of a transmission side to which the present invention is applied. Here, description is given to a case wherein an MPEG system packet is a transport stream packet and a communication system is an ATM.

In the present invention, a PLL on the reception side is constructed such that jitters are removed not in an analog fashion but by modifying a time stamp value PCR by calculation. The communication apparatus of the present invention is characterized in that, also where a plurality of programs (8,192 programs at maximum) are multiplexed in one transport stream, a modification value can be calculated for each of PCRs in them to remove jitters.

Figure 6:
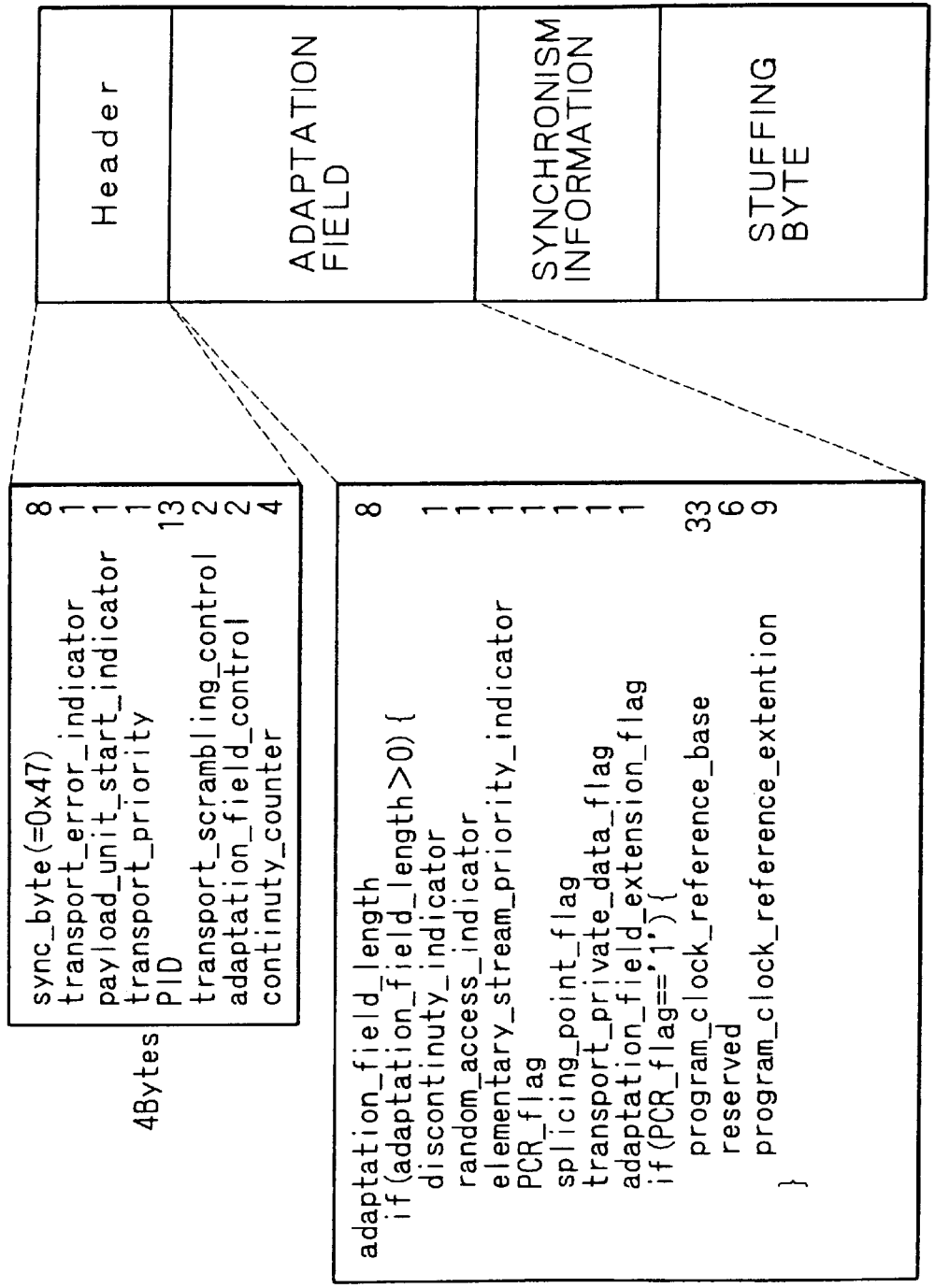
FIG. 6 is a diagrammatic view illustrating a format of a transport stream used in the communication apparatus of FIG. 5.

A transport stream packet MPEG-TS (hereinafter referred to as PCR packet) which has been generated by encoders not shown and multiplexed by a system encoder not shown, and wherein a program clock reference PCR which is a time stamp representative of time information of continuous time series data of images, sound and so forth is added for each predetermined period of time (which need not necessarily be fixed) is inputted to a SYNC_BYTE detection section 501 of a transmission side communication apparatus 500 to which the present invention is applied. The SYNC_BYTE detection section 501 detects a SYNC_BYTE included in a header of a transport stream packet MPEG-TS to effect packet synchronization. An output of the SYNC_BYTE detection section 501 is supplied to a PCR packet detection section 502 and a synchronization information processing section 504. The PCR packet detection section 502 detects based on the value of an adaptation_field_control included in the header of the transport stream packet MPEG-TS whether or not the inputted transport stream packet MPEG-TS is a PCR packet, and when it detects the packet a PCR packet, it outputs a PCR packet detection signal Dp representing this to a counter 503 and the synchronization information processing section 504. A construction of the transport stream packet MPEG-TS which includes the adaptation_field_control is shown in FIG. 6. It is to be noted that the transport stream packet MPEG-TS shown in FIG. 6 is a PCR packet including a header, an adaptation field, synchronization information according to the present invention, and stuffing bytes.

The counter 503 counts output clocks of a PLL 506 and then outputs, when it receives a PCR packet detection signal Dp from the PCR packet detection section 502, a count value NCOUNT to the synchronization information processing section 504. Operation of the PLL 506 is hereinafter described.

When the synchronization information processing section 504 receives a PCR packet detection signal Dp from the PCR packet detection section 502 and a count value NCOUNT inputted thereto from the counter 503, it performs calculation from a PCR (this is referred to as EPCR) included in a PCR packet, of synchronization information to be used by a communication apparatus 700 of the reception side for synchronization, that is, an arrival interval EPAT of PCRs and a synchronization residual (RTS) which corresponds to a difference between a count value NCOUNT of a network clock signal NCK and an original PCR value. More particularly, when an EPCR1 which is the first EPCR is detected by the PCR packet detection section 502, the synchronization information processing section 504 detects an offset value OFFSET1 based on a count value NCOUNT1 supplied from the counter 503 and the EPCR1, and stores the EPCR1 and the offset value OFFSET1 into a memory 505. Then, when an EPCR2 which is the next EPCR is detected by the PCR packet detection section 502, the synchronization information processing section 504 calculates a synchronization residual RTS1 based on a NCOUNT2 supplied thereto from the counter 503, the EPCR2, and the offset value OFFSET1 stored in the memory 505. Then, a synchronization information insertion section 507 inserts, when a PCR packet is supplied thereto, the synchronization residual RTS1 and the arrival interval EPAT1 regarding the PCR packet as synchronization information into the PCR packet and outputs the resulting PCR packet to an MPEG-to-ATM conversion section 508. It is to be noted that, if a transport stream packet MPEG-TS other than a PCR packet is supplied, then the synchronization information insertion section 507 outputs the inputted transport stream packet MPEG-TS as it is.

The MPEG-to-ATM conversion section 508 converts a transport stream packet MPEG-TS into ATM cells and outputs the ATM cells to a network 100.

Here, the MPEG-to-ATM conversion section 508 is constructed such that it not only transmits ATM cells to the network 100, but also receives ATM cells successively transmitted thereto from the network 100.

Then, the MPEG-to-ATM conversion section 508 generates a clock signal of 8 kHz synchronized with the network 100 based on the received ATM cells and outputs the clock signal to the PLL 506. The PLL 506 includes a voltage controlled oscillator (VCO) which outputs a clock signal of 27 MHz, a frequency divider which divides the output of 27 MHz of the VCO to 1/3,375 and outputs another clock signal of 8 kHz, and a phase comparator which compares the phases of the output of the frequency divider and the clock signal of 8 kHz from the MPEG-to-ATM conversion section 508 with each other and outputs a result of the comparison to the VCO.

It is to be noted that, while a transport stream packet MPEG-TS is sometimes transmitted with a plurality of programs multiplexed therein, in the present embodiment, since the memory 505 stores an offset value OFFSET1 and a synchronization residual RTS, even if the transport stream packet MPEG-TS includes a plurality of programs multiplexed therein, it can be processed if the offset value OFFSET1 and the synchronization residual RTS corresponding to each program is stored in the memory 505 and, upon use, the offset value OFFSET1 and the RTS corresponding to each of the programs are selectively used.

Figure 7:
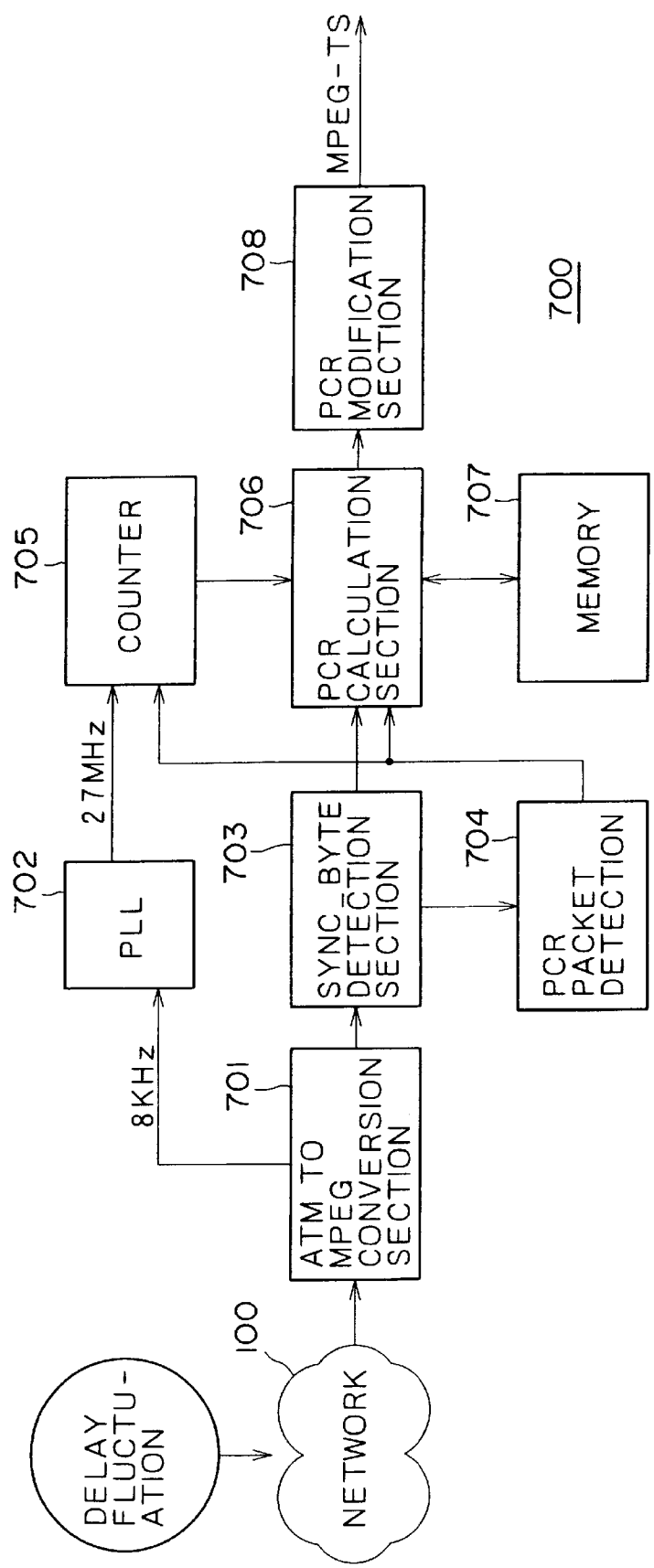
FIG. 7 is a block diagram showing a communication apparatus of the reception side to which the present invention is applied.

A construction of the reception side communication apparatus 700 is shown in FIG. 7. Referring to FIG. 7, on the reception side communication apparatus 700, ATM cells transmitted from a network 100 are received and inputted to an ATM-to-MPEG conversion section 701. The ATM-to-MPEG conversion section 701 converts the ATM cells into a transport stream packet MPEG-TS. Further, the ATM-to-MPEG conversion section 701 generates a clock signal of 8 kHz synchronized with the network based on the received ATM cells and supplies the clock signal to a PLL 702. It is to be noted that the PLL 702 has a construction similar to that of the PLL 506.

A SYNC_BYTE detection section 703 detects the SYNC_BYTE to synchronize the transport stream packet MPEG-TS. The transport stream packet MPEG-TS whose synchronism has been established is supplied to a PCR packet detection section 704 and a PCR calculation section 706. The PCR packet detection section 704 detects whether or not the received transport stream packet MPEGTS contains a PCR, that is, whether or not the received transport stream packet MPEG-TS is a PCR packet, and outputs, if the received transport stream packet MPEG-TS is a PCR packet, a PCR packet detection signal Dp to a counter 705 and the PCR calculation section 706. The counter 705 outputs, when it receives a PCR packet detection signal Dp, a count value RNCOUNT to the PCR calculation section 706. The PCR calculation section 706 calculates, when the PCR packet detection signal Dp is inputted from the PCR packet detection section 704 and the count value RNCOUNT is inputted from the counter 705, a value for modification on a PCR (this is hereinafter referred to as RPCR) included in the PCR packet.

More particularly, when a RPCR1 which is the first RPCR is detected by the PCR packet detection section 704, the PCR calculation section 706 calculates an offset value ROFFSET1 from a count value RNCOUNT1 supplied from the counter 705 and a RPCR1 and stores the offset value ROFFSET1 into a memory 707. Further, the PCR calculation section 706 stores the RPCR1 as a MPCR1 into the memory 707.

Here, while the MPCR1 is asssumed to be equal to the first EPCR1, alternatively the most likely value may be estimated from N (any arbitrary numbers) EPCRs and RPCRs received in a plurality of cycles at the very beginning and determined as MPCR1.

Further, the PCR calculation section 706 stores the arrival interval EPAT1 and the synchronization residual RTS1 included in the PCR packet into the memory 707.

Then, the PCR calculation section 706 calculates, when a RPCR2 which is the next RPCR is detected by the PCR packet detection section 704, an RPCR2 from a count value RNCOUNT2 supplied from the counter 705 and the offset value OFFSET1 stored in the memory 707, calculates an arrival interval RPAT1 from the RPCR2 and the RPCR1 (it is assumed here that the first PCR and MPCR, that is, PCR1 and MPCR1, are equal to each other), and stores the RPCR2 and the RPAT1 into the memory 707. Further, the PCR calculation section 706 calculates a MPCR2 from the MPCR1, arrival interval RPAT1, synchronization residual RTS1 and arrival interval EPAT1 stored in the memory 707, and stores the MPCR2 into the memory 707 and outputs it to a PCR modification section 708.

The PCR modification section 708 replaces an EPCR2 included in the PCR packet with the MPCR2 supplied from the PCR calculation section 706 to modify the value of the PCR and outputs PCR packet thus modified to an apparatus such as a decoder not shown.

Subsequently, a transmission method and a calculation technique for synchronization information necessary to modify a PCR are described in detail with reference to FIG. 8. Downwardly directed arrow marks arranged in the upper stage indicate positions of PCR packets arriving at the transmission side communication apparatus 500. Upwardly directed arrow marks below a straight line in the upper stage indicate clocks synchronized with the network 100.

The lower stage represents the reception side communication apparatus 700, and downwardly directed arrow marks of broken lines indicate PCR packets arriving at the reception side communication apparatus 700 after a fixed delay. If the delay in the network 100 has a fixed value, then receptions of PCR packets occur at such intervals as indicated by broken lines. However, the receptions of the PCR packets are actually influenced by delay fluctuations in the network and are displaced from the positions of the fixed delay as indicated by downwardly directed arrow marks of solid lines. The widths of such displacements are indicated by double-sided arrow marks of broken lines. Further, upwardly directed arrow marks in the lower stage indicate clocks synchronized with the network 100.

Figure 8:
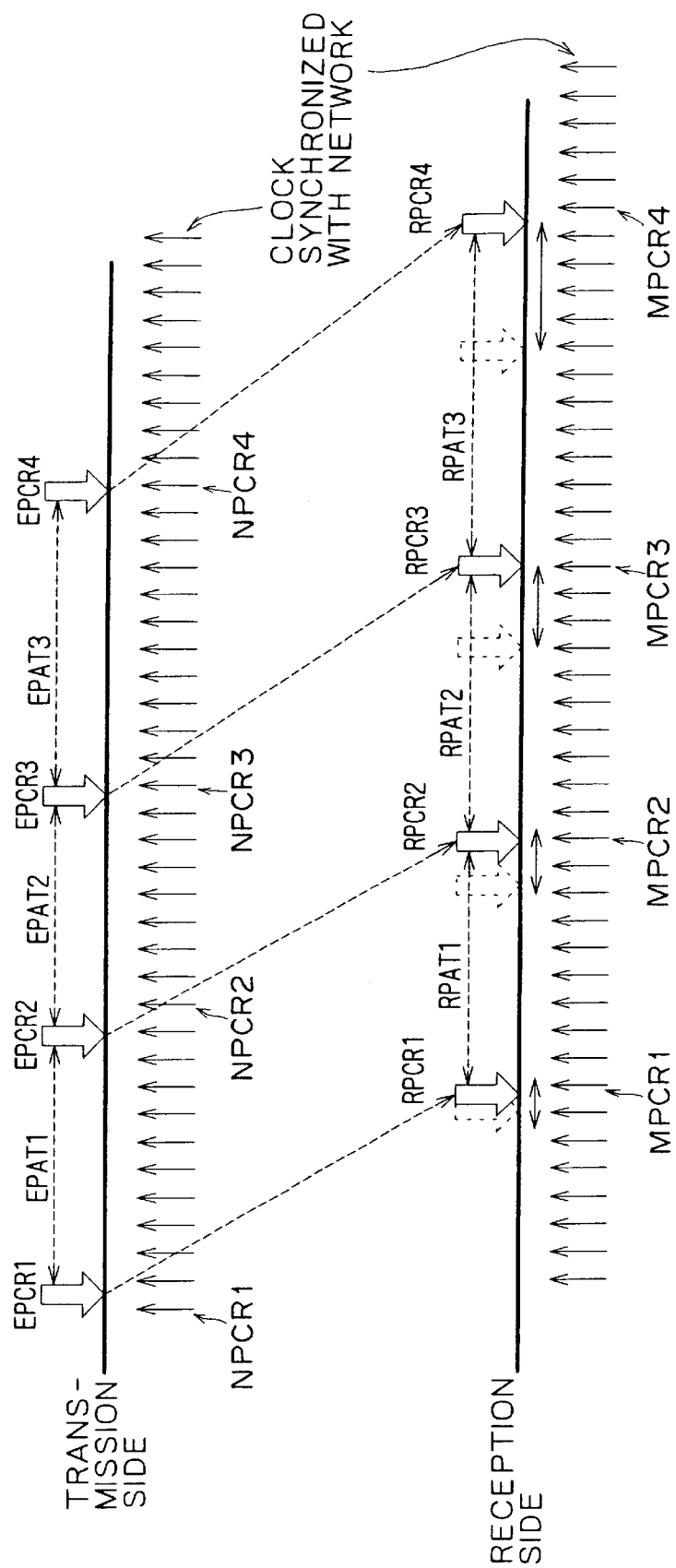
FIG. 8 is a diagrammatic view illustrating synchronization information used in the communication apparatus of the present invention.

The variables used in FIG. 8 represent the following values:

EPCR: a PCR value inserted by an encoder or a multiplexing apparatus

NPCR: a PCR value obtained by counting with clocks synchronized with the network from a certain reference point NPCR': a PCR value adjusted to the EPCR for next calculation RPCR: a PCR value obtained by counting clocks synchronized with the network from a certain reference point on the reception side MPCR: a PCR value obtained by modification from the EPCR, RPCR and synchronization information EPAT: a PCR interval between two successive PCRs on the transmission side RPAT: a PCR interval between two successive PCRs on the reception side NCOUNT: a value of a counter which operates with a clock signal synchronized with a transmission side network clock signal RNCOUNT: a value of a counter which operates with a clock signal synchronized with a reception side network clock signal OFFSET: an offset value between the count value of the transmission side and the NPCR ROFFSET: an offset value between the count value of the reception side and the RPCR.

An EPCR1 which arrives first is determined as a reference point for synchronization information and is made correspond to the count value NCOUNT of the network clock signal which represents the same time scale as PCRs. In other words, such an offset value OFFSET1 that satisfies;

$$EPCR1=NPCR1=NCOUNT1+OFFSET1$$

is stored into the memory 707. Further, for calculation upon arrival of a next PCR, the NPCR1 is stored into the memory 707.

With regard to an EPCR2 arriving next, an arrival interval EPAT1 from the EPCR1 counted with a clock signal synchronized with the network and a synchronization residual RTS1 of this interval from the EPCR2 are calculated. In particular, $$EPAT1=NPCR2=NPCR1$$

$$RTS1=EPCR2-(EPCR1+EPAT1)$$

The arrival interval EPAT1 and the synchronization residual RTS1 are transmitted as information for synchronization to the reception side communication apparatus 700. In this instance, in order to make the value of the NPCR2 with the value of the EPCR2 the same, the offset value from the count value of the counter 705 is modified. In particular, $$OFFSET2=OFFSET1+RTS1$$

Since the counting is started at a point of time when the EPCR2 arrives, the NPCR2 is updated with this offset value OFFSET2 as given by;

$$NPCR2'=NCOUNT2+OFFSET2$$

As the values of the NPCR2' and the offset value OFFSET2 are stored into the memory 707, when a packet which includes the next PCR arrives, calculation for synchronization information can be performed similarly;

$$NPCR3=NCOUNT3+OFFSET2$$

$$EPAT2=NPCR3-NPCR2'$$

Thereafter, calculation shown by expressions similar to the expressions given above is repeated.

On the other hand, as described above, in the reception side communication apparatus 700, if the delay of the network 100 is a fixed delay, the interval after which a PCR arrives is held by the transmission side, and PCRs arrive at intervals of downwardly directed arrow marks of broken lines. However, the PCRs are influenced by delay fluctuations on the network 100, they actually arrive as indicated by the downwardly directed arrow marks of solid lines. Consequently, if it is intended to input the PCRs to the decoder not shown without modifying them at all, PCR jitters become larger than the value specified by the standards and have an influence on an image and so forth. If the delay is a fixed delay, then the PCRs arrive at intervals of the value of the arrival interval EPAT1 counted by the transmission side communication apparatus 500, and then, a PCR value can be set by adding the synchronization residual RTS1 from the network clock to the interval. Since the arrival interval is varied by delay fluctuations, a value with which an arriving PCR should be modified can be estimated by proportionally calculating the arrival interval and the synchronization residual RTS.

In particular, $$MPCR2=MPCR1+RPAT1+RTS1 \times RPAT1/EPAT1$$

where RPAT1=RPCR2−MPCR1

Also the counter on the reception side synchronized with the network can calculate with an offset value in a similar manner as on the transmission side.

$$RPCR1=RNCOUNT+ROFFSET1$$

$$ROFFSET2=ROFFSET1+RTS1 \times RPAT1/EPAT1$$

By modifying the PCR value in this manner, PCR jitters can be set to a value within the range of the MPEG standards.

Then, an information amount considered to be necessary for the arrival interval PAT and the synchronization residual RTS is to be calculated.

In the case of PCR packets, one packet is present within 0.1 second based on the standards of the document [3] mentioned hereinabove. Accordingly, for the count value, 1/10 of 27 MHz, that is, 24 bits are sufficient while it is divided into a base part and an extension part similarly to a PCR. Further, as for a synchronization residual, the allowable value of the PCR clock is estimated based on the MPEG standards, such as;

27,000,000±810 [Hz]

Accordingly, since one sample of synchronization data (RTS) is present within 0.1 second, the range within which the synchronization data RTS can be taken is;

RTS=±81 [Hz]

because it is

810×0.1=81

In short, if the range of the synchronization data RTS is set in the range of −125 to 125, the synchronization data RTS can be transferred with 1 byte sufficiently.

Accordingly, 4 bytes in total including 3 bytes for the arrival interval PAT and one byte for the synchronization residual RTS should be transmitted to the reception side.

According to the standards, a transport stream packet including a PCR may store audio and/or video data or may store only an adaptation field including a PCR. Since a packet including a PCR is normally most frequently transmitted with a proprietary PID, synchronization information may be placed at any arbitrary position from an adaptation field including a PCR to the end of the packet. In addition, since the length of information in a packet is designated in its header, the synchronization information is stored and transmitted following the header.

On the reception side, when a packet including a PCR is detected, synchronization information stored following the adaptation field is read and used for PCR calculation.

Further, while, in the embodiment described above, a clock signal which can be used commonly in an ATM network is used as the clock signal synchronized with the network, the clock signal may be any common clock signals which are synchronized on the transmission side and the reception side.

For example, a clock signal which is synchronized with a clock signal obtained from a global positioning system (GPS) may be used.

According to the present invention, even if delay fluctuations are generated on a network when audio data and/or video data are digitized using an ATM communication technology or the like, and thus digitized data are encoded in accordance with, for example, the MPEG system, whereafter the encoded data are converted into packets to transmit via a transport stream of the MPEG system through a predetermined network or a like case, jitters of a time stamp can be removed by transmitting, from the transmission side, an arrival interval between packets which include a time stamp and synchronization residual data from a time stamp value of a clock signal synchronized with the network using the clock signal synchronized with the network and modifying, on the reception side, the time stamp making use of the information thus transmitted from the transmission side. This also makes decoding possible with a reference which satisfies a studio quality. Further, also for a stream on which a plurality of programs are multiplexed, modification calculations of PCRs of the programs can be performed independently of each other.

While a preferred embodiment of the present invention has been described using specific terms, such description is for illustrative purposes only, and it is to be understood that changes and variations may be made without departing from the spirit or scope of the following claims.

What is claimed is:

1. A communication apparatus comprising:
   a detection means for detecting a packet which includes a time stamp;
   a counting means for producing a clock signal synchronized with a clock signal common with that of the reception side and counting the number of clocks of the clock signal;
   an extraction means for extracting the count value of said counting means when a packet in which a time stamp is included arrives;
   a calculation means for determining an arrival interval between packets in which a time stamp is included and a synchronization residual making use of the count value extracted by said extraction means and the time stamp; and
   a transmission means for transmitting the packet arrival interval and the synchronization residual obtained as a result of said calculation means.

2. A communication apparatus comprising:
   a reception means for receiving a packet;
   a time stamp means for detecting a packet which detects, from among packets received by said reception means, those packets which include a time stamp in which information regarding a packet arrival interval and a synchronization residual is included;
   a detection means for detecting the packet arrival interval and the synchronization residual from the time stamp obtained as a result of said time stamp means;
   a modification value calculation means for calculating a modification value for the time stamp from the packet arrival interval and synchronization residual and a count value obtained by counting clocks of a clock signal synchronized with a clock signal common to that of the transmission side; and
   a modification means for modifying the time stamp included in said received packets based on said modification value.

* * * * *